July 24, 1962 — H. O. HENZE — 3,045,942
SPINNING REEL CONSTRUCTION
Filed May 20, 1960
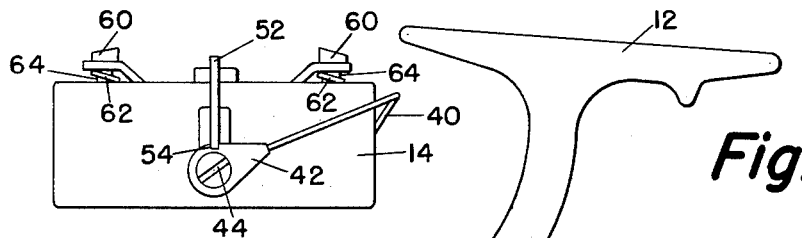
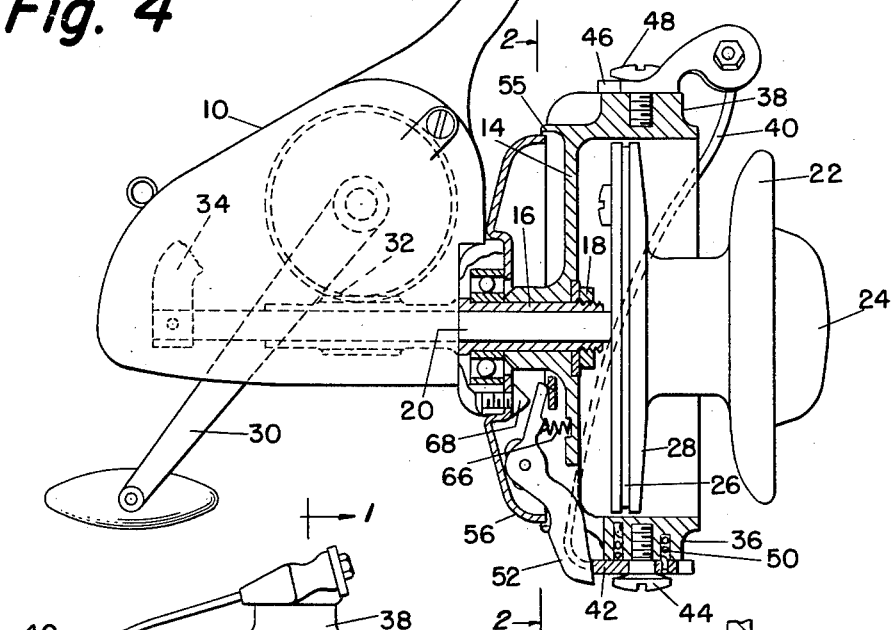
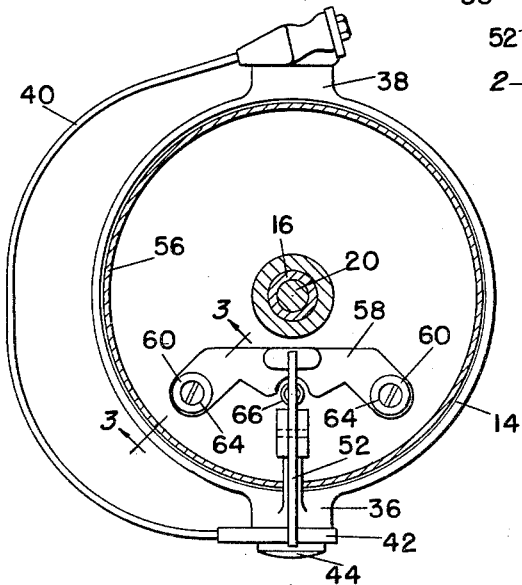
INVENTOR.
HERBERT O. HENZE
BY
Caesar and Rivise
ATTORNEYS р
United States Patent Office 3,045,942
Patented July 24, 1962

3,045,942
SPINNING REEL CONSTRUCTION
Herbert O. Henze, 3924 Netherfield Road,
Philadelphia 29, Pa.
Filed May 20, 1960, Ser. No. 30,580
9 Claims. (Cl. 242—84.21)

This invention relates to spinning reels for fishing rods used in casting for fish, and particularly to a safety brake to prevent accidental unlatching of the winding or pickup bail during casting.

A spinning reel is constructed to operate with a spool that generally does not rotate either during casting or during wind up of the line back on the spool. During casting, the end of the spool is free to permit the line to spin off the spool without rotation thereof. Thereby, no rotating masses are associated with the moving line, and no backlash occurs.

However, in order to terminate the cast, it is necessary to move the winding bail across the free end of the spool to engage and check the line. This movement of the winding bail is produced, in turn, by rotation of the spool cup relative to the main housing. It has been found however, that, during casting, the spool cup might accidentally rotate and the winding bail would engage the line to terminate the cast prematurely.

Accordingly, it is one object of this invention to provide a new and improved spinning reel.

Another object is to provide a new and improved spinning reel having means to prevent accidental premature termination of a cast without interfering with the normal operation of the reel.

Another object is to provide a new and improved spinning reel having a mechanism to prevent accidental rotation of the spool cup during a cast, which mechanism is effective, economical and reliable.

Another object is to provide a spinning reel with a new and improved winding bail detent arrangement.

In accordance with this invention, a spinnig reel is provided with a brake to prevent accidental rotation of the spool cup when the winding bail is latched for casting. This brake does not interfere with the release of the line during the cast or interfere with the retrieving of the casted line.

The foregoing and other objects of this invention as well as the novel features thereof may be more fully appreciated from the following description when read together with the accompanying drawing, in which:

FIG. 1 is a side view of a spinning reel embodying this invention partly in elevation and partly in section along the line 1—1 of FIG. 2;

FIG. 2 is a sectional view taken along lines 2—2 of FIG. 1;

FIG. 3 is a sectional view along the line 3—3 of FIG. 2; and

FIG. 4 is an end view in elevation as viewed along the arrows 4—4 of FIG. 2 with the winding bail in a different position.

In the drawing corresponding parts are referenced by the same numerals.

The housing 10 of the spinning reel in FIG. 1 is attached to a fishing rod (not shown) by means of the bracket portion 12. The housing 10 rotatably mounts a spool cup 14 which is secured to a shaft housing 16 by means of a nut 18 attached to the threaded end of the shaft housing 16. The shaft housing 16 slidably contains within it a reciprocating rod 20 that is connected at one end to a spool 22 to reciprocate that spool and permit rotation thereof. The spool 22 is secured to the shaft 20 by means of a nut 24 threaded thereto, which nut may be constructed in a manner known to the art to provide a brake for the spool. A groove 26 in the inner flange 28 of the spool is adapted to receive a felt packing.

The cup 14 and spool 22 are driven by suitable mechanisms contained within the housing 10 and manipulated by a crank handle 30. The mechanism may include a worm and gear 32 for rotating shaft housing 16 and the cup 14, and a reciprocating mechanism 34 including a cam (not shown) or the like driven together with the gear 32. Suitable mechanisms are well known in the art.

Bosses 36 and 38 project on diametrically opposite sides of the cup 14. A slender winding bail 40 is attached at one end to a cam plate 42 which is rotatably secured to the boss 36 by means of a screw 44. Another attaching plate 46 rotatably secures the other end of winding bail 40 to boss 38 by means of screw 48. An annular recess surrounding the screw hole in boss 36 seats a coiled torsion spring 50; one end of which is fixed in a recess in the plate 42, and the other end of which extends through the boss 36.

The torsion spring 50 biases the bail 40 to the position shown in FIG. 1. The bail 40 is pivotable to the position shown in FIG. 4, in which position it is latched by a detent 52 seating in a groove 54 extending in from the rim of cam plate 42. The detent 52 and associated mechanism is attached to the bottom of spool cup 14 and generally enclosed by a skirt 55 on the cup 14 (FIG. 3) and by an annular cover plate 56 fixed to the housing 10. The cylindrical outside portion of the cover plate fits within the skirt 55, and the inside portion of the cover plate is shaped to form a bearing race.

The detent 52 is a crank lever that is centrally pivoted to the cup 14 within the skirt 55 and extends through the skirt to engage the rim of the cam plate 42. The other end of the detent 52 engages the central portion of a brake plate 58 (FIGS. 2 and 3) that supports two nylon brake shoes 60 on either side of the detent 52 thereby holding brake shoes 60 out of contact with cover plate 56 as shown in FIG. 3. A coil spring 62 surrounds each of two guide pins 64 that pass slidably through the shoes 60 and plate 58 and are threaded in the base of the cup 14. The springs 62 bias the shoes toward engagement with the conical surface of cover plate 56 whenever the restraining action of detent 52 against plate 58 is removed. The action of these springs 62 is effective together with expansion spring 66, a coil spring between the detent 52 and cup 14 to bias the detent against the cam plate 42. The shoes 60 are shaped to be similar to the conical shape of the cover plate 56, and the two shoes have their braking surfaces inclined in opposite directions from the detent 52 (FIG. 4). A conical cam actuator 68 is threaded into the cover plate at a position adjacent the rotational path of the inner end of the detent 52 to engage that detent in one position thereof.

In operation, fishing line may be reeled onto the spool 22 by manipulation of the handle 30 in the usual fashion through rotation of the winding bail 40 with the spool cup. The bail 40 winds the line on the spool, when it is in the position shown in FIG. 1. In this position of the bail 40, the detent 52 rides on the rim of the cam plate 42 (FIG. 1), and the other end of the detent 52 engages the brake plate 58 to hold it out of engagement with the cover plate 56.

When the winding bail 40 is pivoted to the other side of the cup 14 (FIG. 4), the detent 52 is biased by spring 66 into the groove 54 to latch the bail in that position. The brake plate 58 is free of the detent 52, and the springs 62 (FIG. 3) bias the shoes 60 into engagement with the cover plate 56. Thereby, rotation of the cup 14 with respect to the housing 10 is restrained.

This movement of the bail 40 to the position shown in

FIG. 4, frees the line to unwind off the outer end of the spool 22. The reel is then in casting condition with cup 14 rotated somewhat from the position shown in FIG. 1 so that the cam actuator 68 is away from the detent 52 as shown in FIG. 1. Upon termination of the cast the cup 14 is rotated in the usual fashion to move the detent 52 over the cam actuator 68. The detent 52 is cammed out of the groove 54 to release the winding bail 40 for rotation under the action of torsion spring 50. The brake shoes 60 are also released from engagement by the same action of the detent 52.

With the above described brake arrangement 60, the cup 14 is prevented from accidental rotation such as might occur during casting. Thus, premature actuation of the detent to release the bail is prevented. Accordingly, an otherwise good cast will not be spoiled by such an accident. The effect of the brake shoes is such as not to be affected materially by the force required for rotation of the spool cup 14 by manipulation of the crank handle 30 at the end of a cast. During winding, the brake shoes 60 are always disengaged.

Thus, it is seen from the foregoing description that a new and improved spinning reel is provided. Premature termination of a cast due to accidental rotation of the spool cup is prevented. The mechanism is effective and reliable and does not interfere with normal operation of the reel. The mechanism is also economical in construction.

The foregoing description of a preferred embodiment of this invention is illustrative of the principles thereof and is not intended as a limitation of the scope thereof. Modifications of this invention within the spirit thereof will be apparent to those skilled in the art from the foregoing description.

What is claimed as the invention is:

1. A spinning reel comprising a housing, a spool cup rotatable on said housing, a spool mounted for reciprocatory movement in said spool cup, a winding bail movable across said spool and spool cup between winding and casting positions, means for latching said bail in casting position, resiliently biased brake means actuated in response to movement of said latching means for restricting rotation of said spool cup with respect to said housing during casting, and means for releasing said bail from its casting position and said spool cup for rotation in winding position.

2. A spinning reel as recited in claim 1 wherein said latching means comprises, a lever pivoted to said spool cup; said brake being engageable by said lever and movable into braking engagement with said housing in one position of said lever and into disengagement therefrom in another position of said lever, a cam surface rotatable with said winding bail and effective to control movement of said lever into casting position as said bail is moved from its winding to its casting position.

3. A spinning reel comprising a housing, a spool cup rotatable on said housing, means for rotating said spool cup, a spool mounted in said spool cup, a winding bail pivotally mounted on said spool cup and spring biased to one position on said cup for winding line on said spool, means for engaging said bail and latching it in a second, opposite position on said cup, resilienty biased brake means actuated in response to movement of said latching means for braking rotation of said cup relative to said housing during casting, and an actuator for unlatching said bail and for releasing said cup for rotation by said first-named means.

4. A spinning reel as recited in claim 3 wherein said brake means includes a brake shoe attached to said spool cup, said brake shoe being spring biased towards engagement with a surface of said housing, said latching means including a detent for urging said brake shoe to a disengaged position against said spring bias when said winding bail is in said winding position.

5. A spinning reel as recited in claim 4 wherein said latching means includes positioning means having means for positioning said detent thereby permitting engagement of said brake shoe under said spring bias when said winding bail is in said casting position, said detent being effective to engage said positioning means to latch said bail in said casting position.

6. A spinning reel as recited in claim 5 wherein said means for positioning said detent includes a cam plate secured to an end of said winding bail and pivoted therewith, said cam plate having a rim portion for engaging said detent when said bail is in said winding position, and having a groove in the rim thereof for receiving said detent when said bail is in said casting position.

7. A spinning reel as recited in claim 3 wherein said brake means includes a plurality of brake shoes, a plate attached to said shoes and spring biased for engagement with said housing; said latching means including a detent pivoted between said shoes for engaging said brake plate for disengagement of said shoes in one position of said winding bail and for latching a portion of said winding bail in another position thereof.

8. A spinning reel as recited in claim 7 wherein said housing has a conical brake engaging surface, and said brake shoes have surfaces inclined away from each other.

9. A spinning reel as recited in claim 7 wherein said housing is of a generally flat surface, and said brake shoes having surfaces complementary therewith.

References Cited in the file of this patent

UNITED STATES PATENTS

| 2,498,987 | Duncan | Feb. 28, 1950 |
| 2,863,617 | Chapin et al. | Dec. 9, 1958 |
| 2,919,077 | Underwood et al. | Dec. 29, 1959 |

FOREIGN PATENTS

| 908,659 | France | Oct. 11, 1945 |